(12) United States Patent
Bean et al.

(10) Patent No.: US 10,146,418 B2
(45) Date of Patent: *Dec. 4, 2018

(54) IN-LANE EXCEPTION HANDLING

(71) Applicant: Oracle International Corporation, Redwood Shores, CA (US)

(72) Inventors: Erik Bean, Fair Oaks, CA (US); Jeffrey Thomas Colvard, Wilkinsburg, PA (US); Taruna Gautam, Dublin, CA (US); Brian Cohen, Clayton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/054,410

(22) Filed: Feb. 26, 2016

(65) Prior Publication Data

US 2016/0179360 A1  Jun. 23, 2016

Related U.S. Application Data

(63) Continuation of application No. 12/625,062, filed on Nov. 24, 2009, now Pat. No. 9,274,871.

(51) Int. Cl.
*G06F 11/07* (2006.01)
*G06F 11/36* (2006.01)
(Continued)

(52) U.S. Cl.
CPC ...... *G06F 3/04847* (2013.01); *G06F 11/0769* (2013.01); *G06F 11/36* (2013.01);
(Continued)

(58) Field of Classification Search
CPC .. G06F 11/36; G06F 17/246; G06F 17/30595; G06F 17/243; G06F 11/0781; G06F 11/0769; G06Q 10/067
(Continued)

(56) References Cited

U.S. PATENT DOCUMENTS 6,023,267 A  2/2000 Chapuis et al.
6,751,758 B1  6/2004 Alipui et al.
(Continued)

OTHER PUBLICATIONS

CodeProject: User Friendly Exception Handling, Jun. 21, 2004, http://codeproject.com/KB/exception/ExceptionHandling.aspx?display!print, 10 pages.
Developer's Resource Kit, Exception Application Block Details, Enterprise Library 3.1, obtained May 25, 2009, http://www.eduweb.vic.gov.au/devreskit/appdev/standards-details.htm, 10 pages.
Introduction to the Exception Handling Application Block, Enterprise Library 4.0, May 2008, http://msdri.microsoft.com/en-us/library/cc511859.aspx, 6 pages.
(Continued)

*Primary Examiner* — Rinna Yi
(74) *Attorney, Agent, or Firm* — Kilpatrick Townsend & Stockton LLP (57) ABSTRACT

This disclosure describes, generally, methods and systems for implementing in-lane exception handling. The method includes displaying, on a user terminal display device, a first user interface (UI) configured to display application data in organized rows and columns, receiving, by a data management system, updates and/or edits to the application data, and calculating, by the data management system, the updated and/or edited application data. The method further includes analyzing, by the data management system, the updates and/or edits to determine one or more of associated errors, warnings, and exceptions, and displaying, within the first UI, a graphical representation for each of the errors, warnings, and exceptions in the row and/or column of the application data where the error, warning, or exception has occurred.

17 Claims, 9 Drawing Sheets

(51) Int. Cl.
*G06F 3/0484* (2013.01)
*G06F 17/30* (2006.01)
*G06F 17/24* (2006.01)

(52) U.S. Cl.
CPC ...... *G06F 3/04842* (2013.01); *G06F 11/0787* (2013.01); *G06F 17/246* (2013.01); *G06F 17/30595* (2013.01)

(58) Field of Classification Search
USPC ........ 714/E11.207, 37, 48, 57; 715/709, 212
See application file for complete search history.

(56) References Cited

U.S. PATENT DOCUMENTS

| | | | |
|---|---|---|---|
| 7,065,714 B1 * | 6/2006 | Theel | G06F 17/30572 715/781 |
| 7,360,125 B2 | 4/2008 | Krebs | |
| 7,370,244 B2 | 5/2008 | Breitling et al. | |
| 7,380,214 B1 | 5/2008 | Giormov | |
| 7,451,403 B1 | 11/2008 | Srinivasan et al. | |
| 7,506,212 B2 | 3/2009 | Ramamurthy et al. | |
| 9,274,871 B2 | 3/2016 | Bean et al. | |
| 2003/0081003 A1 | 5/2003 | Kutay et al. | |
| 2005/0278587 A1 | 12/2005 | Breitling et al. | |
| 2005/0283675 A1 | 12/2005 | Krebs | |
| 2006/0101326 A1 | 5/2006 | Todd | |
| 2009/0204926 A1 | 8/2009 | Cochrane | |

OTHER PUBLICATIONS

Kalev, Danny, "Exception Handling,", originally obtained May 25, 2009, http://gethelp.devx.com/techtips/cpp_pro/10min/2002/June/10min0602.asp, 1 pages.

Making WCF and ELMAH published on May 5, 2009, http://wilihughes.me/20090805/making-wcf-and-elmah-play-nice-together/.

U.S. Appl. No. 12/625,062, "Advisory Action", dated Sep. 18, 2012, 3 pages.

U.S. Appl. No. 12/625,062, "Final Office Action", dated Aug. 2, 2013, 13 pages.

U.S. Appl. No. 12/625,062, "Final Office Action", dated Jul. 31, 2014, 15 pages.

U.S. Appl. No. 12/625,062, "Non-Final Office Action", dated Dec. 24, 2013, 16 pages.

U.S. Appl. No. 12/625,062, "Non-Final Office Action", dated May 15, 2015, 17 pages.

U.S. Appl. No. 12/625,062, "Notice of Allowance", dated Oct. 22, 2015, 18 pages.

U.S. Appl. No. 12/625,062, "Office Action", dated Jul. 5, 2012, 12 pages.

U.S. Appl. No. 12/625,062, "Office Action", dated Jan. 19, 2012, 14 pages.

U.S. Appl. No. 12/625,062, "Office Action", dated Feb. 15, 2013, pp. 12 pages.

* cited by examiner

ID-LANE EXCEPTION HANDLING

CROSS-REFERENCES TO RELATED APPLICATIONS

The present application is a continuation of U.S. patent application Ser. No. 12/625,062 filed Nov. 24, 2009, entitled "IN-LANE EXCEPTION HANDLING," the entire contents of which are incorporated herein by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to error handling and, more particularly, to in-lane exception handling.

BACKGROUND

Presently, error handling and reporting in enterprise (or similar) systems requires a user to navigate away from the main transactional area. Thus, the ability for a user to troubleshoot errors and exceptions within the enterprise system is significantly limited. For example, when an error occurs, the user must switch to an error viewing pane or window to determine the nature of the error. Then, the user must switch back to the transactional window of pane to determine how the error or exception applies to the task the user had been working on when the error or exception occurred. Hence, the utility value of the error and exception reporting is greatly diminished, and accordingly improvements in the art are needed.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

SUMMARY OF THE INVENTION

One embodiment of the present invention describes a method for implementing in-lane exception handling. The method includes displaying, on a user terminal display device, a first user interface (UI) configured to display application data in organized rows and columns, receiving, by a data management system, updates and/or edits to the application data, and calculating, by the data management system, the updated and/or edited application data. The method further includes analyzing, by the data management system, the updates and/or edits to determine one or more of associated errors, warnings, and exceptions, and displaying, within the first UI, a graphical representation for each of the errors, warnings, and exceptions in the row and/or column of the application data where the error, warning, or exception has occurred.

According to another embodiment of the present invention, a system for implementing in-lane exception handling. The system includes a user terminal including a display device configured to display a first user interface (UI) displaying application data in organized rows and columns. The system further includes a data management system configured to receive updates and/or edits to the application data, calculate the updated and/or edited application data, analyze the updates and/or edits to determine one or more of associated errors, warnings, and exceptions. The first UI is further configured to display a graphical representation for each of the errors, warnings, and exceptions in the row and/or column of the application data where the error, warning, or exception has occurred.

A further embodiment of the present invention includes a machine-readable medium for. The machine readable medium cause a machine to display, on a user terminal display device, a first user interface (UI) configured to display application data in organized rows and columns. The machine readable medium further causes the machine to receive updates and/or edits to the application data, calculate the updated and/or edited application data, and analyze the updates and/or edits to determine one or more of associated errors, warnings, and exceptions. Then, the machine readable medium causes the machine to display a graphical representation for each of the errors, warnings, and exceptions in the row and/or column of the application data where the error, warning, or exception has occurred.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

According to aspects of the present invention, having the ability to identify errors in-line and in real-time, and having all of the information a user needs to fix/address the error available within the application framework allows the user, in many instances, to fix the error problems within the same page or sets of pages. This avoids the need to navigate outside of the main transactional work space. Furthermore, easy identification of errors and warnings, exposure of detailed messages allowing for quick exception resolution, and a lower cost of ownership by saving the user time from navigating to other areas of the application framework are achieved.

Figure 1:
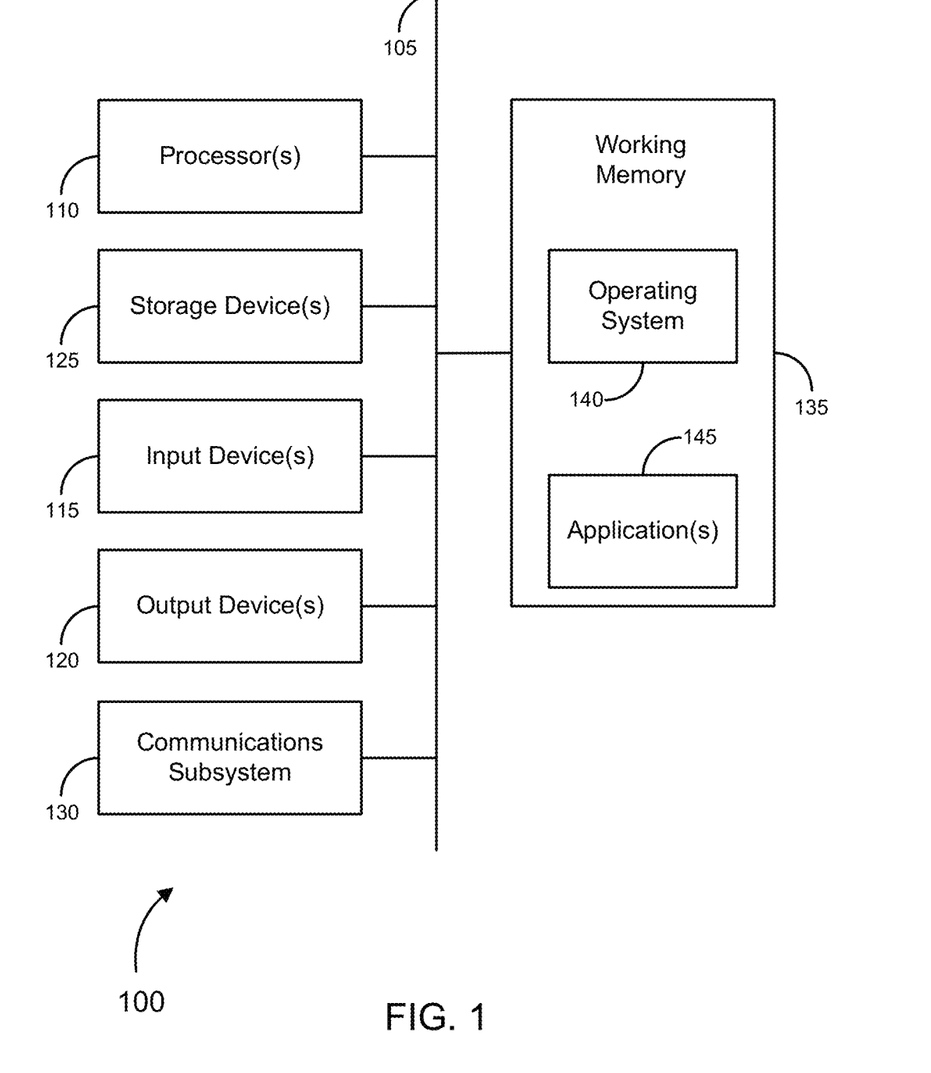
FIG. 1 is a generalized schematic diagram illustrating a computer system, in accordance with various embodiments of the present invention.

FIG. 1 provides a schematic illustration of one embodiment of a computer system 100 that can perform the methods of the invention, as described herein. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation, one or more general purpose processors and/or one or more special purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 100 might also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation, dynamic memory, such as the working memory 135. Transmission media includes coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 110 retrieves and executes the instructions. The instructions received by the working memory 135 may optionally be stored on a storage device 125 either before or after execution by the processor(s) 110.

Figure 2:
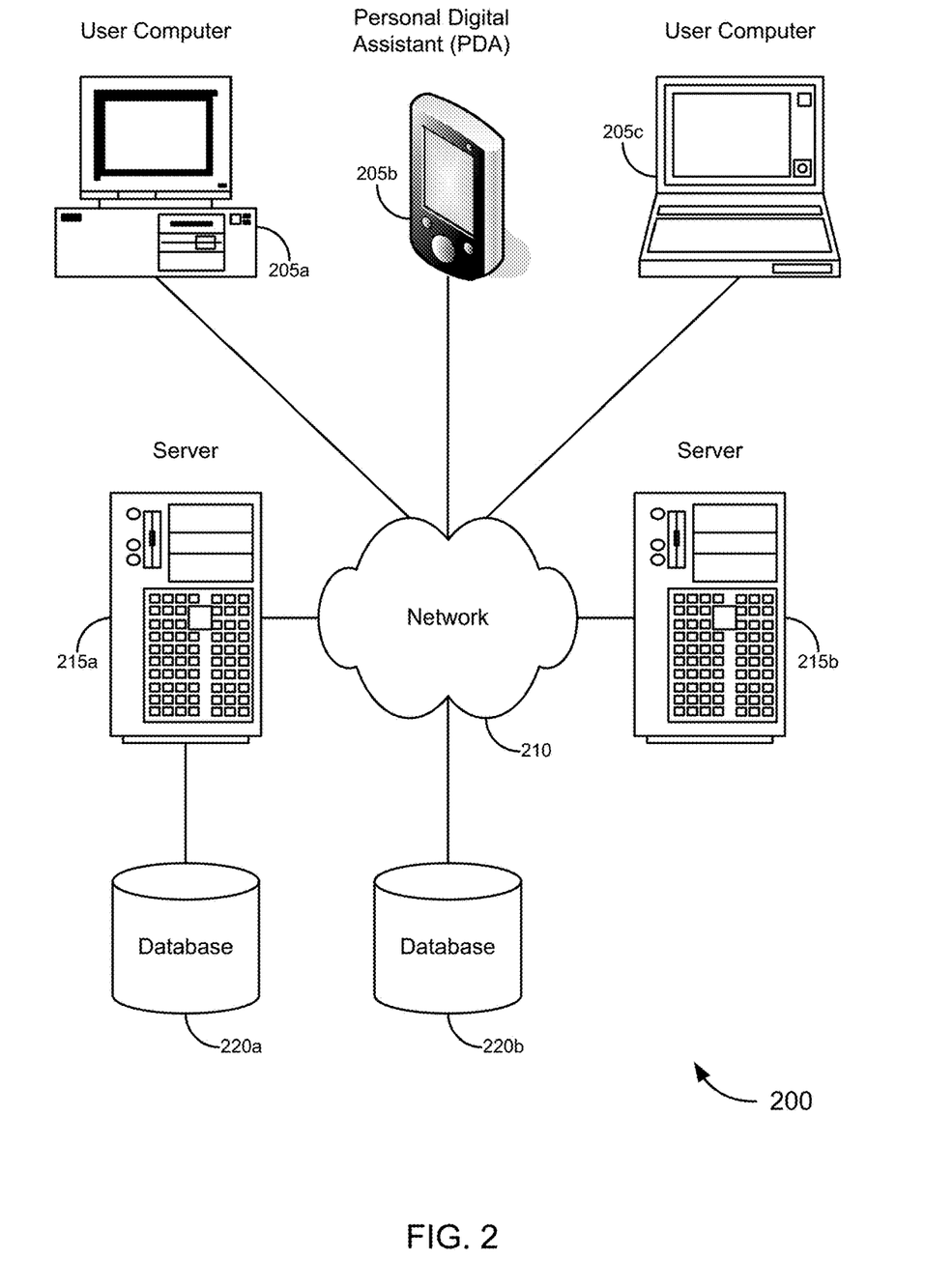
FIG. 2 is a block diagram illustrating a networked system of computers, which can be used in accordance with various embodiments of the present invention.

Merely by way of example, FIG. 2 illustrates a schematic diagram of a system 200 that can be used in accordance with one set of embodiments. The system 200 can include one or more user computers 205. The user computers 205 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents. Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more application servers, which can include one or more applications accessible by a client running on one or more of the client computers 205 and/or other servers 215. Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 205 and/or another server 215. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an application server. In some cases a web server may be integrated with an application server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary. Merely by way of example, a database 220a might reside on a storage medium local to (and/or resident in) a server 215a (and/or a user computer 205). Alternatively, a database 220b can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

When users plan in the context of a project plan, budget, or forecast, each one of these planning features is comprised of a header (or a version) as well as a number of plan lines that makeup the actual project plan, budget, or forecast. It is important to note that there may be a one to many relationship between the header (version) and the plan lines.

During the planning and management phase of the project life cycle a project manager will use one or many of the planning features to estimate and control the costs and/or revenue that are incurred by the project. During this planning phase the project manager may encounter exceptions in the application (either for the version as a whole or on a specific plan line). These exceptions may include the following issues: bad setup data, rate schedules are not present for planned resources, scheduling of resources, approvals are not met, incorrect account information, exceeding planning limits, etc.

To resolve these (and other) issues, the project manager needs the ability to view the version level and line level (plan line) exceptions within the context of the version. This allows the user to start at the highest level exceptions and traverse down the hierarchy of plan line exceptions. Accompanying the ability to identify exceptions by traversing down the plan hierarchy, the user also needs the appropriate information to be able to resolve the exceptions. It is this ability to quickly identify exceptions while providing the necessary information to resolve the exceptions which provides a significant benefit.

Figure 3:
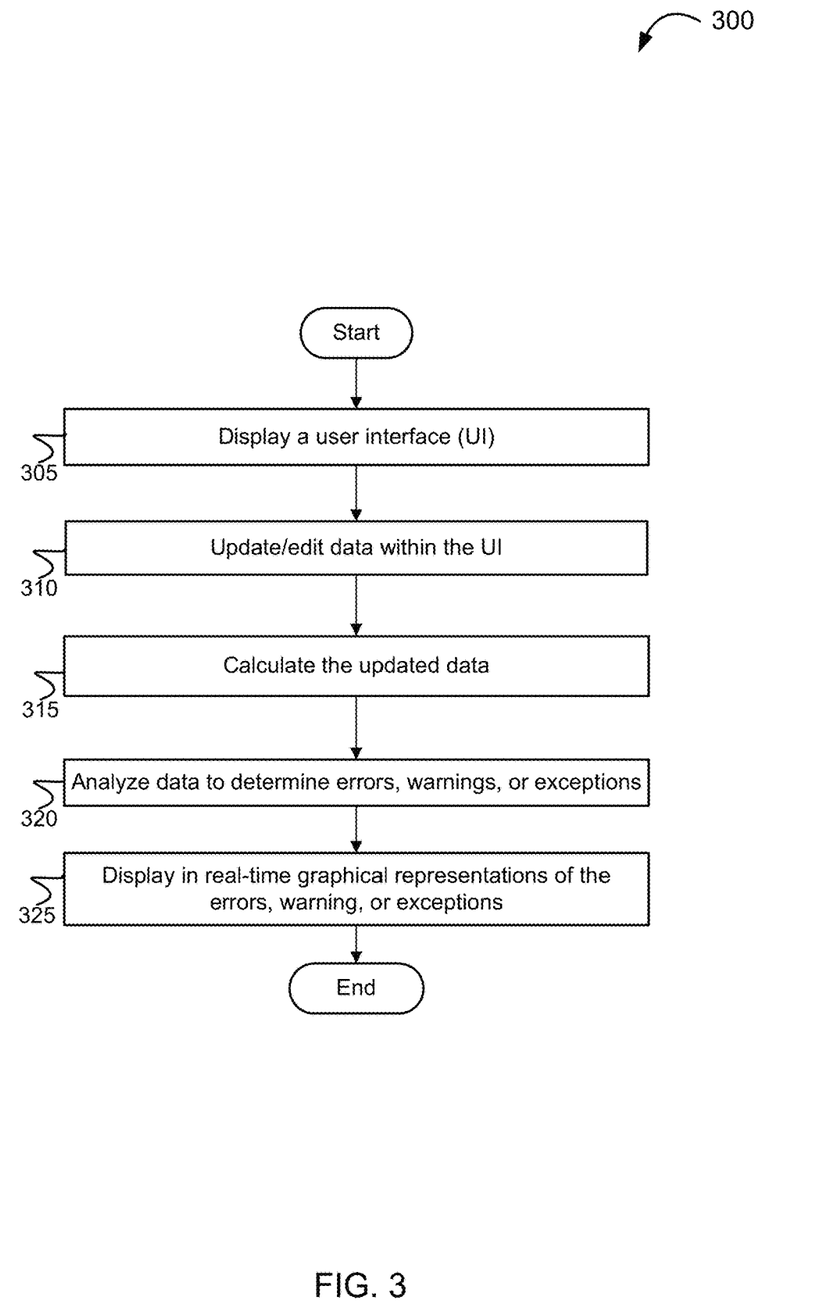
FIG. 3 is a flow diagram illustrating a method of implementing in-lane exception handling, in accordance with another embodiment of the present invention.

Turning now to FIG. 3, which illustrates a method 300 of implementing in-lane exception handling, according to embodiments of the present invention. At process block 305, a user interface is displayed. The user interface may be displayed on a computer screen, a mobile device, a cellular device, a portable device, a television, etc. The display may incorporate user interface windows and may also be interacted with using an input device. In one embodiment, the input device may include a mouse, a pointer, a touch screen, voice activated input and the like.

At process block 310, updates and/or edits within the user interface may be performed. For example, the user interface may be for a budgeting system and budgeting costs such as rates, exchange rates, labor costs, materials costs, etc. may be edited or entered. This data may be entered manually or may be populated from a storage database. A mechanism for calculating and/or refreshing the user interface to display the updated data is engaged (process block 315). In one embodiment, the mechanism may be a user interface button, which when clicked or selected refreshes and/or updates that new data.

At process block 320, the updated/refreshed data may be analyzed to determine errors, warnings, and/or exceptions. The warnings or errors may be based on, for example, missing data, incomplete data, inaccurate data, etc. Thus, at process block 325, graphical representations of the errors and/or warnings may be displayed in real-time. For example, if the data is displayed in columns and rows, then an exceptions column may be included, and the graphical representations may be placed in that column at the row where the error occurred. Accordingly, method 300 provides for real-time dynamic display of exceptions which are graphically displayed in-lane for each in identification of the errors and remedy of the errors.

Figure 4A:
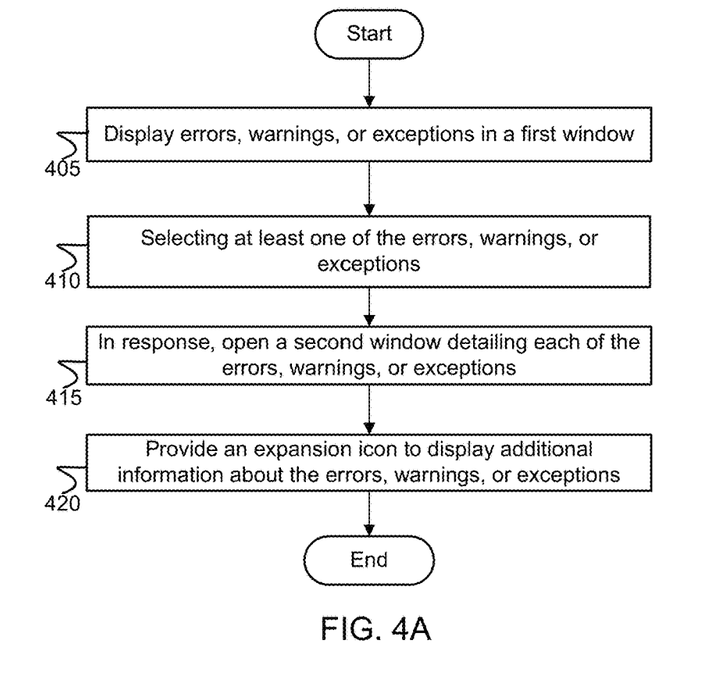
FIGS. 4A and 4B are user interfaces, in accordance with another embodiment of the present invention.

Referring next to FIG. 4A, which illustrates a method of implementing in-lane exception handling, according to a further embodiment of the present invention. At process block 405, the warnings and errors discussed in FIG. 3 may be displayed in a first user interface window. Then, at process block 410, a selection of one of the errors of warnings from the first window is received. In response to the selection, a second window may be opened which details the warnings and errors (process block 415). Furthermore, the second window may also provide details about errors and warnings in addition to the selected error or warning. In addition, at process block 420, the user interface may provide an expansion icon for each error or warning, which when executed expands the view of the error or warning to display additional details about the error or warning. For example, a cause of the error or warning as well as a remedy for the error or warning may be displayed.

Figure 4B:
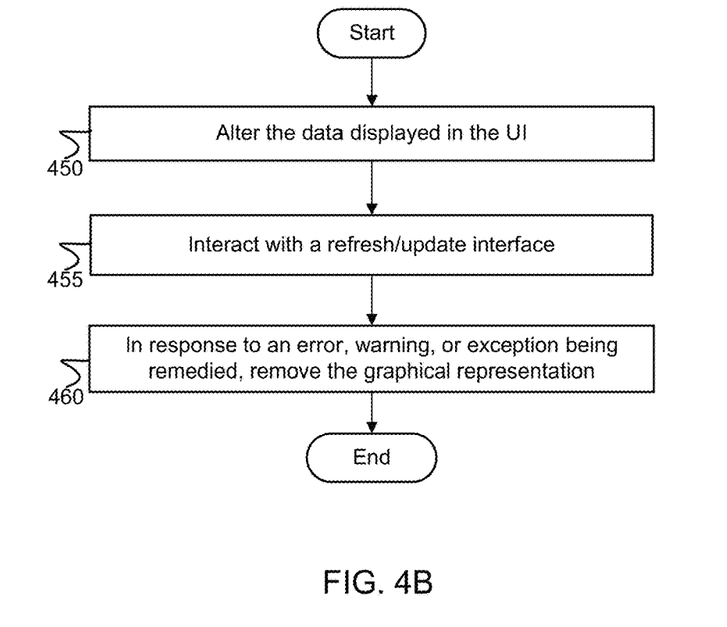

FIG. 4B illustrates a method of implementing in-lane exception handling, according to yet a further embodiment of the present invention. At process block 450, an alteration of the data within the user interface may occur. At process block 455, a refresh/update interface button may be executed. Then, in response, at block 460, errors or warnings which have been remedies may have the graphical representation removed from the user interface. Alternatively, if new errors or warnings occur, then new graphical representations may be displayed.

Figure 5A:
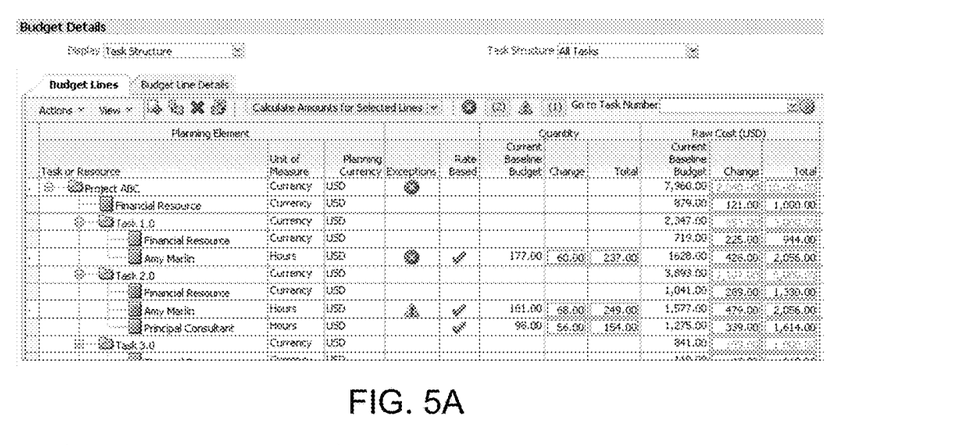
FIGS. 5A, 5B, and 5C are user interfaces, in accordance with another embodiment of the present invention.

Turning now to FIG. 5A which illustrates a user interface in accordance with embodiments of the present invention. Shown in FIG. 5A is one example of a main transactional window for a budget details user interface. Within the budget details is shown a project hierarchy with each line having plan details. The user interface further includes an exception column. In this example user interface, there are three exceptions shown, which are designated by an 'X' within a circle or an '!' within a triangle; nonetheless, other exception, error, and/or warning (graphical or textual) designations may be used.

Thus, every row that has encountered an exception will have an error or a warning indicator in the exceptions column. The exceptions column may be shown on multiple tabs (i.e., budget lines and budget line details), as well as other views (e.g., task structure, resource breakdown structure an list). The default position (i.e., non-personalized) may be the first column after the planning elements. Furthermore, multiple exceptions for a single resource may be displayed. In the case where a resource has encountered multiple errors the exception indicator may only show the graphical display (i.e., an 'X' within a circle) of the highest severity.

Figure 5B:
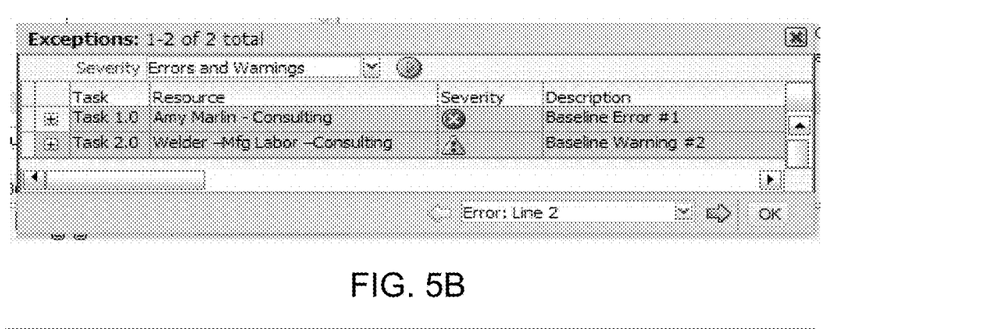

Furthermore, the user interface may display a performance indicator watch list (not shown), which could display a running total of errors and warnings for a plan, as well as a running total of resolved errors and warnings. Each exception may be selected by the user in order to bring up a secondary user interface as in FIG. 5B. FIG. 5B shows on example of a secondary exceptions window. The error that is selected on the main transactional work area (see FIG. 5A) will be the row that is highlighted (or otherwise designated) in the secondary exceptions window. In one embodiment, the cursor in the exceptions secondary window will correspond to the row selected in the main transactional work area.

For example, the user may have selected the error icon for "Amy Marlin-Consulting" in the main transactional work area. Then, when the secondary window is rendered, the cursor position in the secondary window is defaulted to "Amy Marlin—Consulting". If multiple errors are present for "Amy Marlin—Consulting", then the cursor position may default to the first "Error" for "Amy Marlin—Consulting". Furthermore, a brief description of the errors may be included in this secondary window. Additionally, an expansion icon (i.e., a plus icon on the user interface) may be included for each error row.

FIG. 5B further shows a jumping mechanism which is currently labeled as "Error: Line 2". This jumping mechanism allows for a drop-down menu to be displayed, and a user to select a specific error or warning to jump to directly. Additionally, a severity drop-down menu is also available to filter exceptions based on, for example, warnings only, errors only, warnings and errors, etc. Further, it should be noted that the columns in FIGS. 5A and 5B, as well as any other columns described herein, are sortable columns.

According to further aspects of the present invention, when an error in the main transactional window is selected, and the secondary exception window is opened, the user interface input cursor may automatically be placed over the corresponding error or warning on the secondary exception window. In addition, if an error or warning within the secondary exception window is selected, the view in the main transactional window may jump to the location within that windows where the error occurred. Thus, the user interface quickly and easily allows for navigation among errors and across multiple windows.

Figure 5C:
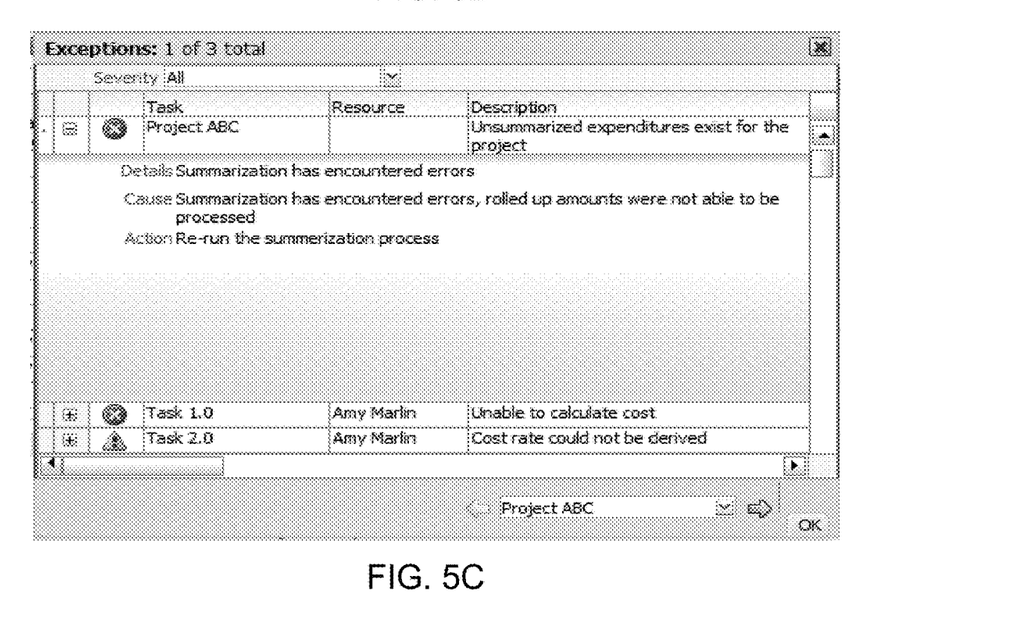
Figure 6A:
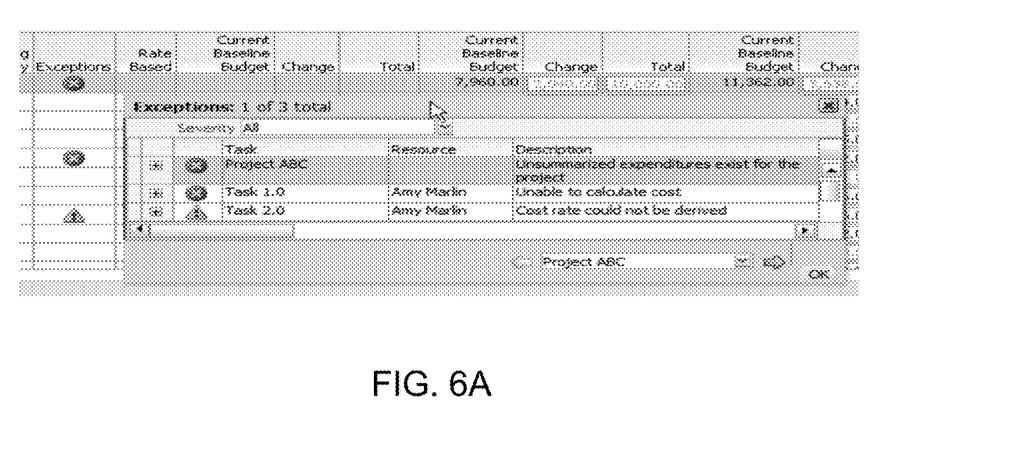
FIGS. 6A and 6B are user interfaces, in accordance with another embodiment of the present invention.
Figure 6B:
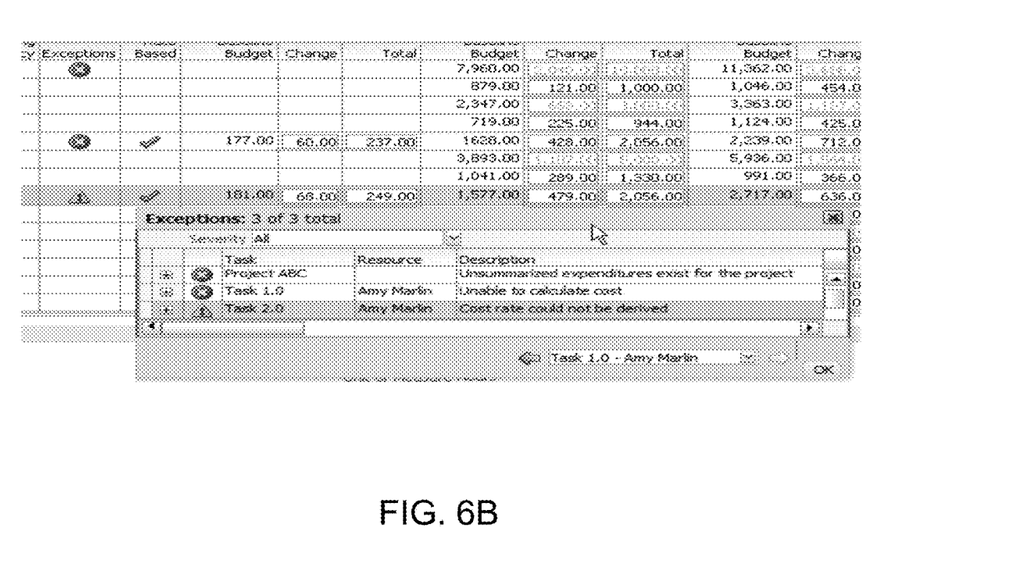

In one embodiment, when the expansion icon is activated, then the view as in FIG. 5C may be shown. The view in FIG. 5C shows additional details for the error or warning, possible causes, as well as actions to remedy the error or warning. Accordingly, for each of the rows additional information about the errors or warnings can be viewed by expanding the expansion icon. Turning next to FIG. 6A which illustrates an alternative view of the secondary user interface. In this view, project level errors may be shown in a single row, and additional error and warning information may be displayed when an expansion icon is activated. FIG. 6B illustrates that when a row in the main viewing area is selected, the row is highlighted in both the main viewing area and the secondary window.

According to further embodiments of the present invention, multiple line exception handling capability is described. This functionality may be available on the following user interface windows: edit Budget/Forecast Page (Task Structure), edit Budget/Forecast Page (Resource Breakdown Structure), edit Budget/Forecast Page (List), review and Finalize Page, manage Version Details Page—not able to execute the secondary window from this page but the user can navigate to this page with the secondary window open, budgets and Forecast List Page, etc.

In addition to displaying any exceptions that apply to the version as a whole, the exceptions window may display exceptions for individual plan lines. For multi-line exception handling, the exceptions window may display exceptions for all lines in the main table that have exceptions and not just for the row where the user selects the icon. This enables the user to continue to review exception messages without continually navigating back to the main window and re-selecting the exceptions icon for another line. For example, on a budget, if six lines have an exception and the user clicks the exceptions icon for the first line, the exceptions window will contain exceptions for all six lines. The window displays the task, resource, and period (if applicable) associated with each exception so that the user is made aware of the context for each exception.

Further embodiments of the present invention provide for trigger events that will expose the exceptions, in for example, the secondary window. These trigger events include: calculate amounts, adjustments, refresh rates, save, save and close, submit, and create baseline. Upon the triggering of one of these events, exceptions may be encountered, and if exceptions are encountered, the secondary exceptions window may be displayed (i.e., the secondary window will be programmatically shown).

A refresh (either full or partial) of the exceptions data may also be executed. The full refresh is when all exception data will be refreshed when the following actions are performed: save, save and close, submit, create baseline. For example, if a user submits a budget, then all cleared exceptions will be deleted and all new exceptions will be populated. The partial refresh is when the data is be refreshed when a user performs one of the following actions: calculate amounts, adjustment, refresh rates, etc. In this situation, only the exception data for the specific action being performed would be refreshed. For example, if the user calculates amounts, only the existing calculate amount exception data will be refreshed, and no other exception data will be refreshed.

Aspects of the present invention allow for the various windows and user interfaces to be non-modal (e.g., the secondary exception window being open does not restrict a user from interacting with the main transactional work area). For example, exceptions in the secondary window are non-modal which allows the user to interact with the main transactional work area while the secondary exceptions window is still displayed to the user. The user has the ability to navigate to other "train stops" with the exceptions secondary window still open (as in FIG. 7).

Figure 7:
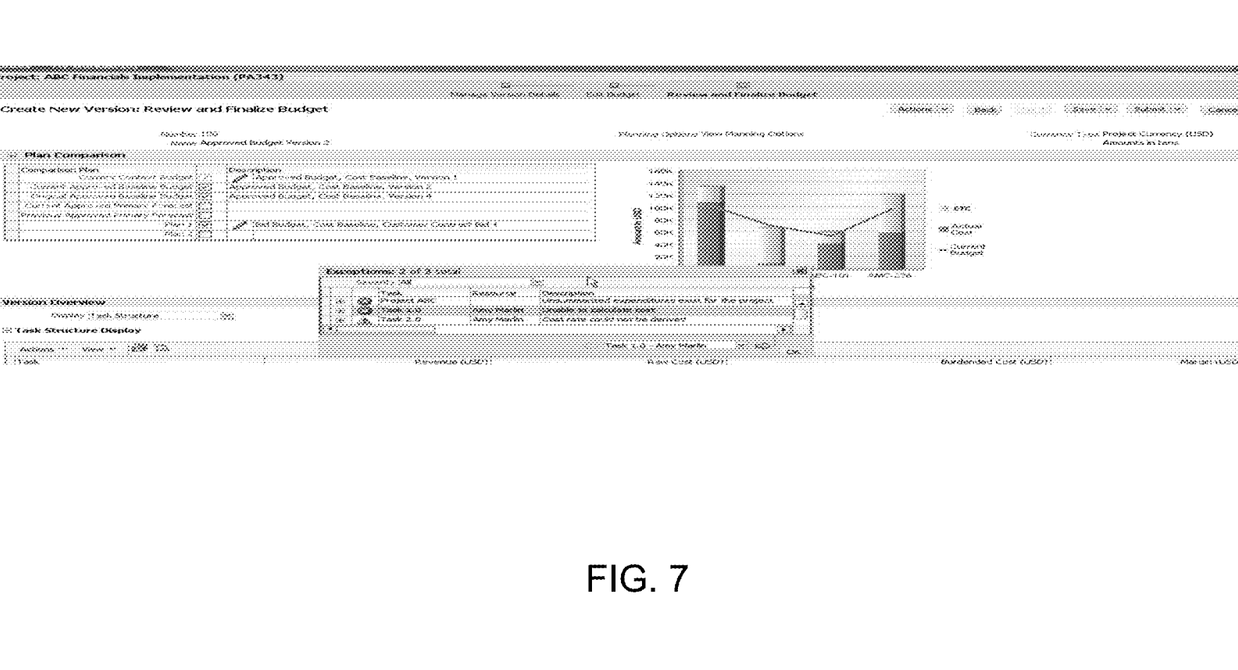
FIG. 7 is a user interface, in accordance with another embodiment of the present invention.

Turning now to FIG. 7 which illustrates a user interface of a train stop view, in accordance with embodiments of the present invention. A train stop represents a step in the budget or forecast version creation business flow. The three step process includes managing the details for the version (i.e., whether to generate from another source, copy an existing version, or manually create the version), editing the details, and reviewing and finalizing the version before submission for approval. Each step in the process is represented by a discrete train stop in the user interface. The financial plan lines to which the exception window references are found on the second train stop where the user edits the budget or forecast lines. When the exceptions window is displayed on the other train stops, the highlighting of the planning elements in the main window does not take place as the lines for the planning elements are not displayed on the other two train stops. All train behavior still applies in this case and the exceptions window does not supersede the train behavior logic. When the user interacts with the secondary window outside of, for example, the Edit Budget/Forecast Train stop, the highlighting of the planning elements are no longer valid and the exceptions window is used purely for reference and may not be used as a navigational aid.

Figure 8A:
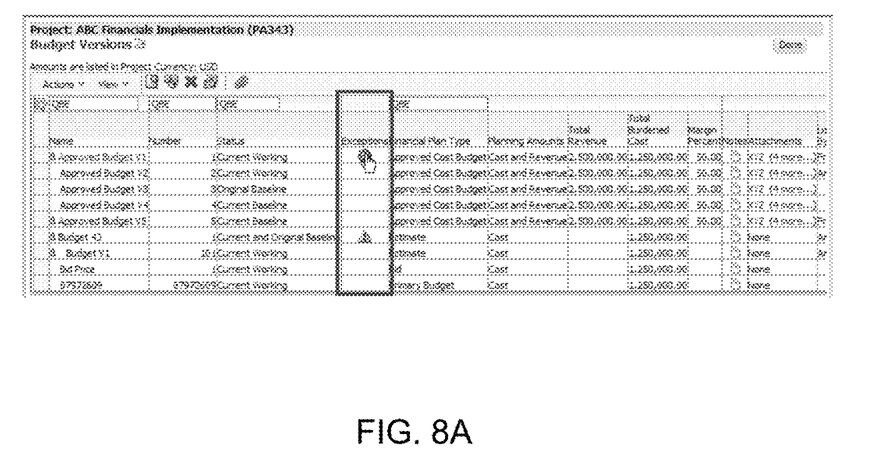
FIGS. 8A and 8B are user interfaces, in accordance with another embodiment of the present invention.
Figure 8B:
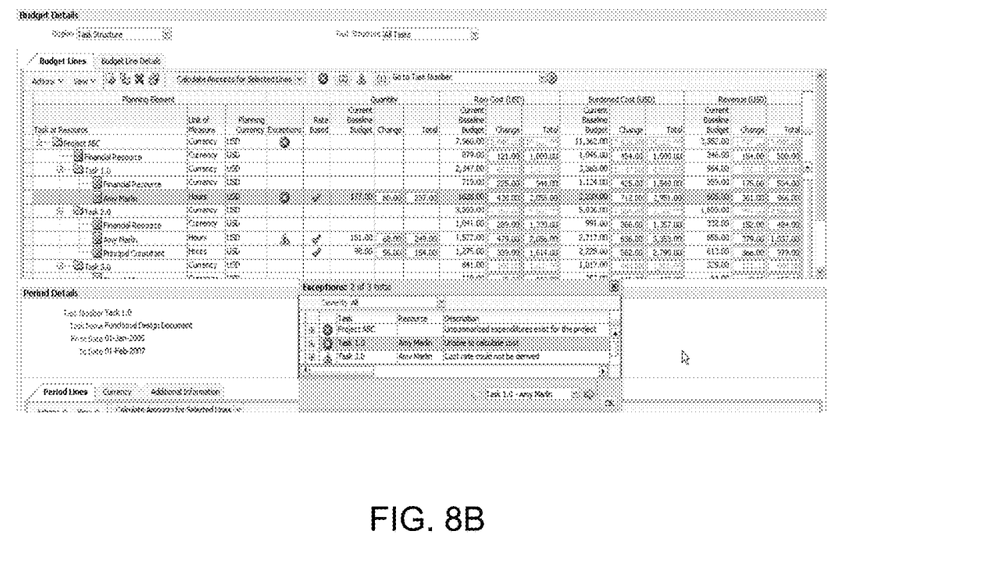

Turning now to FIGS. 8A and 8B which illustrate region information for version level exceptions handling, in accordance with embodiments of the present invention. The display of the exceptions icon may be for each budget/forecast version for a project for any exceptions which have been encountered. The exceptions may be stored at the periodic and the version levels. Multiple exceptions for a version are where a version has encountered multiple exceptions and the exception indicator will show the icon of the highest severity (i.e., either error or warning hyperlink to the edit Budget/Forecast windows). Upon user selection of the exceptions icon the user will be navigated to the edit budget/forecast page. The first exception in the version may be highlighted with the cursor on line (transactional work area.)

The exceptions secondary page may be open upon entry to the edit budget/forecast page with the first exception for the version highlighted. Display of exceptions for versions that have a working status may be displayed as exceptions for versions regardless of the status. Versions with a status other than working would likely not have errors, but could possible have warnings.

Furthermore, version level errors are errors that have been encountered for an entire version and will be associated to the root node of a task structure (e.g., a default H-Grid view). Upon entering the edit budget or forecast page via the exceptions icon on the versions page, the version level errors may be listed first in the exceptions secondary window. The exceptions indicator might only be shown for the task structure view, and not the planning and/or list view.

In a further embodiment, a period view may be displayed. For example, in a budget for a 12 month period, one error in one month may be the same for most or all other months. Thus, instead of displaying the error 12 times, once for each period, a consolidated period view may be displayed. Hence, a more manageable and easier way to read a period filtered error and warnings display is shown.

Figure 9:
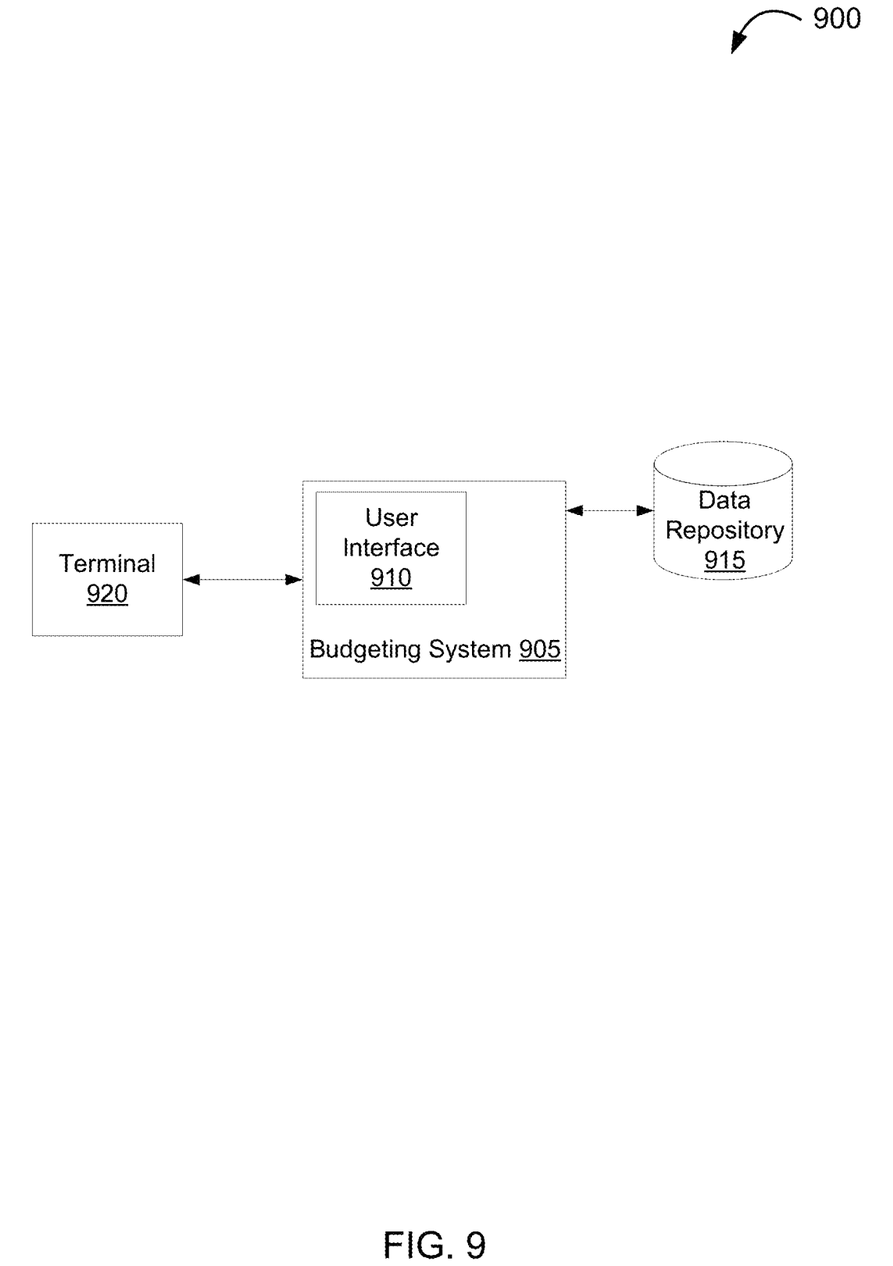
FIG. 9 is a block diagram illustrating a system for implementing in-lane exception handling, in accordance with another embodiment of the present invention.

Turning now to FIG. 9 which illustrates a system 900 for implementing in-lane exception handling, in accordance with embodiments of the present invention. System 900 includes a budgeting system 905 which includes a user interface 910. Budgeting system 905 is in communication with a data repository 915 and a terminal 920. System 900 is configured to implement any one of the methods described in FIG. 3, 4A, or 4B, as well as display any of the user interface windows in FIGS. 5A-8B.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A non-transitory computer-readable storage medium storing instructions which, when executed by one or more processors, cause the one or more processors to perform operations comprising:

rendering, by a data management system, a first user interface (UI) for a plan of a project, the first UI displaying application data in rows and columns, the application data comprising a version of the plan and a plurality of plan lines, the plurality of plan lines being arranged according to a hierarchy and the plurality of plane lines including plain details;

comparing the application data to a predetermined issue set to determine one or more error rows, the issue set defining one or more computer detectable errors, warnings, or exceptions, and an error row of the one or more error rows being a plan line of the plurality of plan lines, within the first UI, that includes at least one of the one or more computer detectable errors, warnings, or exceptions;

rendering one or more error rows having one of the errors, warnings, or exceptions within the first UI, wherein each error row includes a graphical representation indicating at least one of the one or more errors, warnings, or exceptions associated with a corresponding error row;

receiving, a selection of a first graphical representation within the first UI, the first graphical representation being associated with a first error row of the one or more error rows:

in response to the selection of the first graphical representation of the first error row within the first UI, rendering a second UI within a window, the second UI displaying each error row of the first UI including the first error row, wherein the second UI indicates the hierarchy of the plan and both a plan level exception and a line level exception associated with the version of the plan;

further in response to the selection of the first graphical representation of the first error row within the first UI, the first error row is indicated simultaneously in both the first UI and the second UI.

2. The non-transitory computer-readable storage medium of claim 1, wherein rendering of the graphical representation comprises the data management system rendering the graphical representation within a refreshed first UI during a planning and management process.

3. The non-transitory computer-readable storage medium of claim 1,
wherein rendering of a particular graphical representation comprises rendering the graphical representation along with the application data.

4. The non-transitory computer-readable storage medium of claim 1, wherein rendering of the graphical representation comprises causing the graphical representation to be presented in-lane with the application data.

5. The non-transitory computer-readable storage medium of claim 1, wherein rendering of the graphical representation comprises rendering the graphical representation without navigating away from the application data.

6. The non-transitory computer-readable storage medium of claim 1, wherein the operations further comprise:
upon displaying the second UI, automatically placing a cursor over the first error row.

7. The non-transitory computer-readable storage medium of claim 1, wherein further in response to the selection of the first graphical representation, rendering, within the second UI, an expansion icon for each error row.

8. The non-transitory computer-readable storage medium of claim 7, wherein the operations further comprise:
receiving, a selection of at least one of the expansion icons.

9. The non-transitory computer-readable storage medium of claim 8, wherein the operations further comprise:
in response to receiving the selection of at least one of the expansion icons, rendering, within the second UI, information about a corresponding error, warning, or exception for the error row of the second UI containing the selected expansion icon.

10. The non-transitory computer-readable storage medium of claim 9, wherein the information comprises details of the corresponding error, warning, or exception.

11. The non-transitory computer-readable storage medium of claim 9, wherein the information comprises causes of the corresponding error, warning, or exception.

12. The non-transitory computer-readable storage medium of claim 9, wherein the information comprises actions to remedy the corresponding error, warning, or exception.

13. The non-transitory computer-readable storage medium of claim 9, wherein the information about the corresponding error, warning, or exception comprises information necessary to fix/address the corresponding error, warning, or exception in a third UI, the third UI, second UI, and first UI all being distinct.

14. The non-transitory computer-readable storage medium of claim 1, wherein the operations further comprise:
analyzing, during a planning and management process, updates and/or edits to the application data to determine the one or more error rows.

15. The non-transitory computer-readable storage medium of claim 14, wherein the operations further comprise:
receiving, the updates and/or edits during a planning and management process; and
refreshing, the first UI with updated and/or edited application data.

16. The non-transitory computer-readable storage medium of claim 1, wherein the application data comprises a version of a plan that comprises a plurality of plan lines arranged according to a plan hierarchy of a project life cycle.

17. The non-transitory computer-readable storage medium of claim 1, wherein the operations further include:
receiving, via an interaction with the second UI, a selection of one or more error rows displayed within the second UI; and
in response to the selection of the one or more error rows displayed within the second UI, continuing to render the first UI such that the first UI and the second UI are simultaneously displayed.

* * * * *

UNITED STATES PATENT AND TRADEMARK OFFICE
CERTIFICATE OF CORRECTION

PATENT NO. : 10,146,418 B2
APPLICATION NO. : 15/054410
DATED : December 4, 2018
INVENTOR(S) : Bean et al.

It is certified that error appears in the above-identified patent and that said Letters Patent is hereby corrected as shown below:

On the Title Page

Column 2, under Other Publications, Line 3, delete "display!print," and insert -- display=print, --, therefor.

Column 2, under Other Publications, Line 8, delete "msdri." and insert -- msdn. --, therefor.

Signed and Sealed this
Twenty-sixth Day of November, 2019

Andrei Iancu
*Director of the United States Patent and Trademark Office*